United States Patent

[11] 3,554,404

| [72] | Inventor | Richard G. Schmid |
| --- | --- | --- |
| | | Osgood, Ind. |
| [21] | Appl. No. | 788,746 |
| [22] | Filed | Jan. 3, 1969 |
| [45] | Patented | Jan. 12, 1971 |
| [73] | Assignee | Gulf Oil Corporation |
| | | Pittsburgh, Pa. |
| | | a corporation of Pennsylvania |

[54] APPARATUS FOR COLLATING DISCLIKE OBJECTS
2 Claims, 7 Drawing Figs.

| [52] | U.S. Cl. | 221/95 |
| --- | --- | --- |
| [51] | Int. Cl. | B65h 3/44 |
| [50] | Field of Search | 221/95, 93, 112, 265; 53/26, 159; 133/4 |

[56] References Cited
UNITED STATES PATENTS
2,778,368  1/1957  Jaskowiak.................... 133/4X

*Primary Examiner*—Stanley H. Tollberg
*Attorneys*—Richard L. Kelly, Carl A. Cline, Forrest D. Stine and Richard A. Anderson

ABSTRACT: A series of plates having apertures to receive disclike objects is used to collate the objects. Three fixed plates are mounted in a stack with two rotating plates beneath the first and second. The top rotating plate removes one disclike object from each of a series of stacks of disclike objects mounted on the top fixed plate, drops each object through the offset apertures in the second fixed plate into the second rotating plate which drops the collated series of objects through the bottom fixed plate for further handling.

PATENTED JAN 12 1971 3,554,404

INVENTOR
Richard G. Schmid

BY Richard H. Anderson
ATTORNEY

APPARATUS FOR COLLATING DISCLIKE OBJECTS

BACKGROUND OF INVENTION

This invention relates to an apparatus for collating disclike objects.

It is known to feed disclike objects from multiple stacks singly from the stack as in U.S. Pat. No. 3,029,978 or 3,339,798. Also, Bitzer in U.S. Pat. No. 2,672,630 discloses an apparatus for supplying a stack of two bolts of opposite orientation. However, the apparatus of collating a series of disclike objects from multiple stacks taught herein is not shown in the prior art.

The problem solved was how to collate four different colored polyethylene overcaps in a regular series of color. For example, it was desired to have a package of polyethylene overcaps in which the overcaps are white, orange, blue and yellow in that order, or any other regular order repeated throughout the package.

SUMMARY

This problem was solved by devising an apparatus which will collate multiple stacks of disclike objects in a regular repeating series. This is accomplished by stacking the disclike objects, such as polyethylene overcaps, in stacks having a common characteristic, such as color. That is, when the disclike objects are polethylene overcaps, all the overcaps in one stack would be of the same color. Then collation is accomplished by the apparatus of this invention.

One disclike object at a time is removed from each of a multiple number of stacks of disclike objects. These stacks are mounted in a regular spaced circular configuration on a fixed plate having an aperture directly beneath each stack. The disclike object is removed from the bottom of each stack by a rotating plate having an identical aperture or by a lever. This rotatable plate is located between the first and second fixed plates. The second fixed plate has an identical configuration of apertures, but offset from the apertures in the first fixed plate. The first rotatable plate supports the stack of disclike objects except when its aperture is removing an object from the stack. The second fixed plate must be mounted directly beneath the first fixed plate and spaced beneath it only slightly farther than the thickness of one disclike object, so that only one disclike object will be removed from each stack each time the rotating lever or plate having an aperture comes into register lever or plate having an aperture comes into register with the aperture in the first fixed plate. The first rotating plate or lever drops each disclike object through the aperture in the second fixed plate into a collecting rotating plate or lever immediately below the second fixed plate, so that the disclike objects are collected in a regular series order. The second, collecting, rotating plate or lever rotates in register with the first rotating plate or lever. A third fixed plate having a single aperture supports the collected disclike objects until they come into register with the single aperture. When the series of disclike objects does come into register with the aperture in the third fixed plate, the collated disclike objects are dumped out of the collating apparatus for further handling. The apparatus and method can be used in conjunction with conventional inspection and packaging lines so that a package of the collated disclike objects will have a regular repeating order throughout the package.

DESCRIPTION OF THE PREFERRED EMBODIMENTS

Figure 1:
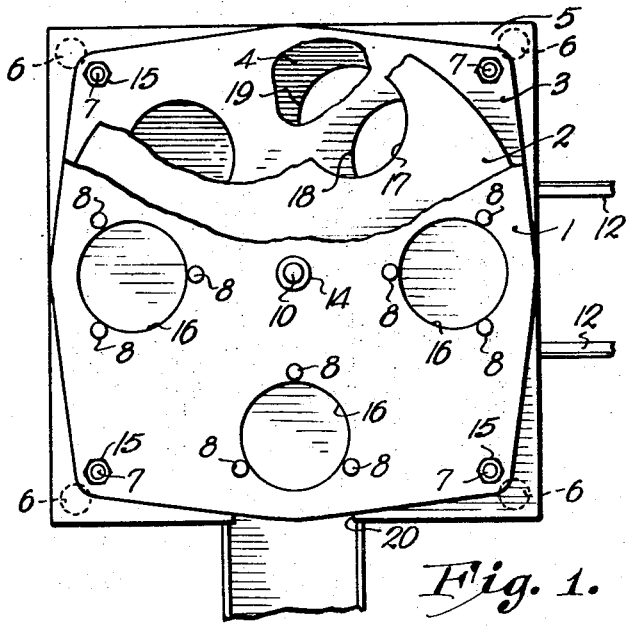
FIG. 1 is a partially cutaway top view of the apparatus of this invention.

In FIG. 1 the first fixed plate 1 is shown having a series of apertures 16 regularly spaced in a circular configuration. These apertures having holding means 8 for receiving disclike objects. Fixed plate 1 is supported by cylindrical supports 7 and secured by bolts 15. Shaft 10 for rotating rotatable plates 2 and 4 is shown secured in bushing 14 in first fixed plate 1.

First rotatable plate 2 having single aperture 17 is shown beneath first fixed plate 1.

Second fixed plate 3 having a series of apertures 18 identical to aperture 16 in plate 1 is spaced on supporting cylinder 7 below first rotating plate 2. Series of apertures 18 are offset from series of apertures 16.

Second rotating plate 4 has aperture 19 in register with aperture 17 in first rotating plate 2.

Third fixed plate 5 is supported by supporting column 6 and has supporting cylinder 7 mounted upon it.

Figure 2:
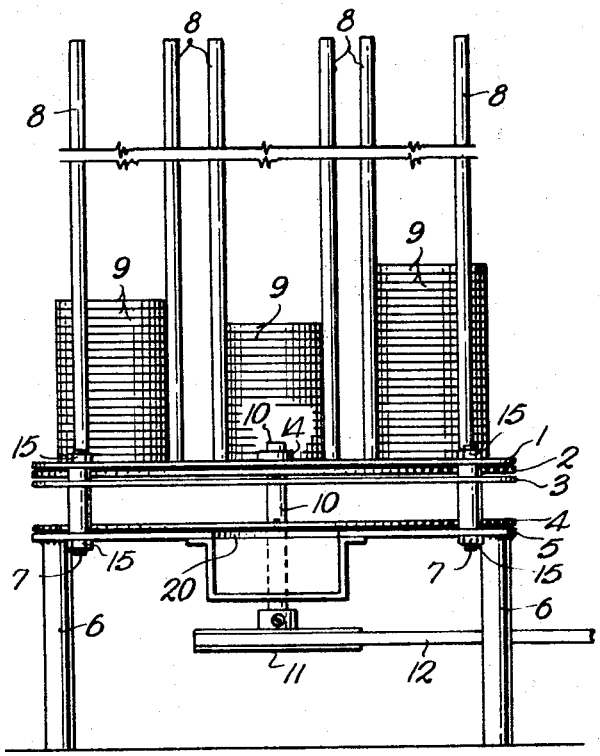
FIG. 2 is an elevational view of the apparatus of this invention.

FIG. 2 shows the method of mounting and spacing of plates 1, 2, 3, 4 and 5 on cylindrical support 7 and support column 6. Holding means 8 hold stacks of disclike objects 9. Shaft 10 rotates rotatable plates 2 and 4 by means of a pulley 11 and belt 12. Plates and cylindrical support 7 are secured by bolts 15.

Figure 3:
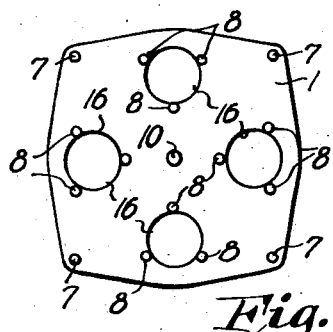
FIG. 3 is the top view of the first fixed plate of the apparatus of this invention.

FIG. 3 shows first fixed plate 1 mounted on cylindrical supports 7 and having holding means 8 mounted directly above apertures 16. Shaft 10 extends through first fixed plate 1.

Figure 4:
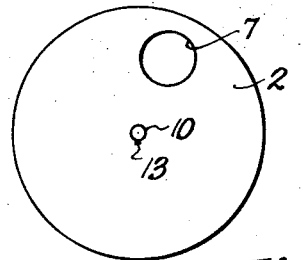
FIG. 4 is a top view of the first rotatable plate of this invention.

FIG. 4 shows first rotatable plate 2 having aperture 17. First rotatable plate 2 is fixed to shaft 10 by means of a keyway 13.

Figure 5:
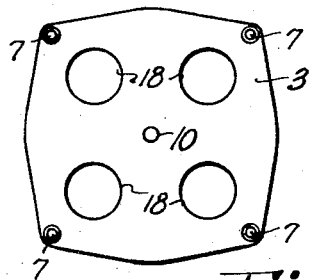
FIG. 5 is a top view of the second fixed plate of the apparatus of this invention.

FIG. 5 shows second fixed plate 3 mounted on cylindrical support 7 and having a series of apertures 18.

Figure 6:
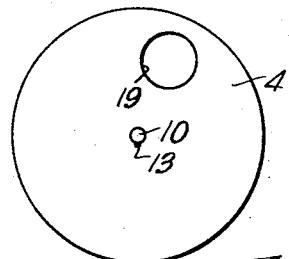
FIG. 6 is a top view of the second rotatable plate of the apparatus of this invention.

FIG. 6 shows second rotatable plate 4 having aperture 19 fixed to shaft 10 by keyway 13.

Figure 7:
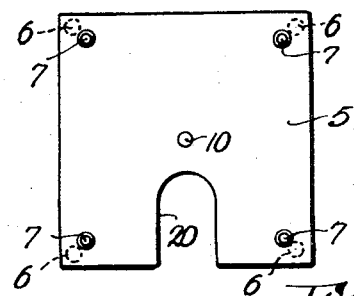
FIG. 7 is a top view of the third fixed plate of the apparatus of this invention.

FIG. 7 shows third fixed plate 5 mounted on supporting column 6 and having cylindrical supports 7 mounted on it. Fixed plate 5 also has aperture 20.

In operation the disclike objects 9 are stacked so that similar objects are all in one stack. For example in the case of polyethylene overcaps, all one stack may be white, next the stack may be all orange and the next may be all yellow and the next may be all blue. These stacks are held by holding means 8 over aperture 16 in the first fixed plate 1. They are supported at the bottom by rotating disc 2 until aperture 17 comes into register with one of the apertures 16 and removes one disc from the bottom of the stack. Rotatable plate 2 must be spaced less than the thickness of one disclike object from the fixed plate 1 so that only one disclike object at a time is removed from the bottom of each stack. Rotatable plate 2 then carries this disc to the next aperture 18 in second fixed plate 3. The apertures 18 in second fixed plate 3 must be mounted directly beneath the first fixed plate 1 and spaced beneath it only slightly farther than the thickness of one disclike object, so that only one disclike object will be removed from each stack each time the aperture 17 in rotatable plate 2 comes into register underneath aperture 16. After falling through aperture 18 in second fixed plate 3 the disclike object 9 is collected in aperture 19 in second rotatable plate 4. The aperture 19 in second rotatable plate 4 must always be in register with the aperture 17 in first rotatable plate 2. Second rotatable plate 4 must be spaced far enough below second fixed plate 3 so that the disclike objects 9 may stack up until the aperture 19 comes into register with aperture 20 in third fixed plate 5. After falling through aperture 20 in third fixed plate 5 the collated disclike objects 9 are ready for further handling. In this way the disclike objects 9 are discharged in regular repeated order determined by their position in the holding means 8.

The rotatable plates could be replaced with a single lever arm and the apparatus would function in the same manner.

I claim:

1. Apparatus for collating disclike objects comprising, in combination:

multiple holding means for a stack of disclike objects mounted in a regular spaced circular configuration upon a first fixed plate having a series of apertures regularly spaced in a circular configuration shaped to receive said disclike objects in register beneath each said holding means;

a second fixed plate having a series of apertures identical to the series of apertures in said first fixed plate and mounted directly beneath but offset from said series of apertures in first fixed plate, whereby said second fixed plate supports said stacks of disclike objects, said second fixed plate mounted spacedly downward only slightly farther than the thickness of one disclike object so that only one disclike object at a time occupies the space between said first and second fixed plates;

a first rotatable means mounted for rotation between said first and second fixed plates, said first rotatable means being rotatable to consecutively remove one disclike object from the bottom of each stack of disclike objects and drop same in respective consecutive apertures of said series of apertures in said second fixed plate;

a third fixed plate having a single aperture therein and spacedly mounted beneath said second fixed plate far enough therebelow so that said disclike objects can become stacked thereon as they are received and collected from said second fixed plate;

a second rotatable means mounted for rotation above and closely adjacent to said third fixed plate, said second rotatable means being rotatable to collect in a stacked fashion said disclike objects as they are received on said third fixed plate from said second fixed plate, said second rotatable means coming into register with said single aperture in said third fixed plate once each revolution thereof to drop the stack of disclike objects therethrough;

means for rotating said first and second rotatable means in registry with each other; and whereby one disclike object from the bottom of each stack is removed upon each rotation of said first rotatable means, thereafter each of these objects drops consecutively through said second fixed plate to be received and collected in a stacked fashion with just one of the objects from all the other stacks on said third fixed plate, thereafter the collected, stacked objects drop through the third fixed plate in the same collated order upon each rotation of said second rotatable means.

2. The collating apparatus of claim 1 wherein said first and second rotatable means are respectively a first and second rotatable plate, each said first and second rotatable plate having a single aperture therein identical to each of the apertures in said first and second fixed plates, said first and second rotatable plates being rotated with their respective apertures in register with each other, said first rotatable plate supporting each of said stacks of disclike objects except when said aperture thereof is in register with one of said series of apertures in said first fixed plate.

PO-1050
(5/69)

UNITED STATES PATENT OFFICE
CERTIFICATE OF CORRECTION

Patent No. 3,554,404          Dated January 12, 1971

Inventor(s) Richard G. Schmid

It is certified that error appears in the above-identified patent and that said Letters Patent are hereby corrected as shown below:

In the drawings, sheet 2, Fig. 4, the number "7", should read --17-- to be correct. Column 1, lines 45 and 46, t second occurrence of "register lever or plate having an aperture comes into" should be deleted. Column 2, line 8, the word "having" should read --have-- to be correct. Column 2, after line 56, should read --offset from the apertures 16 in first fixed plate 1. Second fixed plate 3 must be-- to be correct.

Signed and sealed this 18th day of May 1971.

(SEAL)
Attest:

EDWARD M. FLETCHER, JR.
Attesting Officer

WILLIAM E. SCHUYLER
Commissioner of Pat